(12) United States Patent
Song et al.

(10) Patent No.: US 12,146,838 B2
(45) Date of Patent: Nov. 19, 2024

(54) DEEP LEARNING-BASED CRACK SEGMENTATION THROUGH HETEROGENEOUS IMAGE FUSION

(71) Applicant: THE BOARD OF TRUSTEES OF THE UNIVERSITY OF ALABAMA, Tuscaloosa, AL (US)

(72) Inventors: Wei Song, Tuscaloosa, AL (US); Shanglian Zhou, Tuscaloosa, AL (US)

(73) Assignee: THE BOARD OF TRUSTEES OF THE UNIVERSITY OF ALABAMA, Tuscaloosa, AL (US)

(*) Notice: Subject to any disclaimer, the term of this patent is extended or adjusted under 35 U.S.C. 154(b) by 159 days.

(21) Appl. No.: 17/333,252

(22) Filed: May 28, 2021

(65) Prior Publication Data
US 2021/0372938 A1 Dec. 2, 2021

Related U.S. Application Data

(60) Provisional application No. 63/031,862, filed on May 29, 2020.

(51) Int. Cl.
*G06T 7/55* (2017.01)
*G01N 21/88* (2006.01)
(Continued)

(52) U.S. Cl.
CPC ......... *G01N 21/8851* (2013.01); *G06N 3/045* (2023.01); *G06N 3/08* (2013.01);
(Continued)

(58) Field of Classification Search
CPC ........ G01N 21/8851; G01N 2203/0062; G06T 2207/20221
See application file for complete search history.

(56) References Cited

U.S. PATENT DOCUMENTS 9,551,616 B2 1/2017 McQuilkin et al.
2013/0155061 A1* 6/2013 Jahanshahi ............... G06T 7/11
345/419
(Continued)

FOREIGN PATENT DOCUMENTS

CN 108921846 A * 11/2018 ........... G06N 3/0454
WO 2018165753 9/2018

OTHER PUBLICATIONS

Badrinarayanan et al., SegNet: A deep convolutional encoder-decoder architecture for image segmentation, Jan. 2017, IEEE Transactions on Pattern Analysis and Machine Intelligence, vol. 39, 2481-2495 (Year: 2017).*

(Continued)

*Primary Examiner* — Vincent Rudolph
*Assistant Examiner* — Nicholas Crespo Stazer
(74) *Attorney, Agent, or Firm* — Meunier Carlin & Curfman LLC (57) ABSTRACT

In an embodiment, a method for detecting cracks in road segments is provided. The method includes: receiving raw range data for a first image by a computing device from an imaging system, wherein the first image comprises a plurality of pixels; receiving raw intensity data for the first image by the computing device from an imaging system; fusing the raw range data and raw intensity data to generate fused data for the first image by the computing device; extracting a set of features from the fused data for the first image by the computing device; providing the set of features to a trained neural network by the computing device; and generating a label for each pixel of the plurality of pixels by the trained neural network, wherein a received label for a pixel indicates whether or not the pixel is associated with a crack.

12 Claims, 10 Drawing Sheets

(51) Int. Cl.
*G06N 3/045* (2023.01)
*G06N 3/08* (2023.01)
*G06T 7/00* (2017.01)

(52) U.S. Cl.
CPC .............. *G06T 7/0004* (2013.01); *G06T 7/97* (2017.01); *G01N 2021/889* (2013.01); *G01N 2203/0062* (2013.01); *G06T 2207/20084* (2013.01); *G06T 2207/20221* (2013.01)

(56) References Cited

U.S. PATENT DOCUMENTS

| | | | |
|---|---|---|---|
| 2015/0347831 | A1 | 12/2015 | Tamatsu et al. |
| 2016/0292518 | A1 | 10/2016 | Banitt et al. |
| 2018/0165753 | A1 | 6/2018 | Carter et al. |
| 2019/0154442 | A1 | 5/2019 | Annovi et al. |

OTHER PUBLICATIONS

Shao et al., Remote sensing image fusion with deep convolutional neural network, Mar. 2018, IEEE Journal of Selected Topics in Applied Earth Observations and Remote Sensing, vol. 11, 1656-1669 (Year: 2018).*

Bang et al., Encoder-decoder network for pixel-level road crack detection in black-box images, Feb. 2019, Computer-Aided Civil and Infrastructure Engineering, vol. 34, 713-727 (Year: 2019).*

Non-Final Office Action dated Jun. 26, 2023 in U.S. Appl. No. 17/313,070.

Q. Zou, Z. Zhang, Q. Li, X. Qi, Q. Wang and S. Wang, "DeepCrack: Learning Hierarchical Convolutional Features for Crack Detection," in IEEE Transactions on Image Processing, vol. 28, No. 3, pp. 1498-1512, Mar. 2019, doi: 10.1109/TIP.2018.2878966.

V. Badrinarayanan, A. Kendall and R. Cipolla, "SegNet: A Deep Convolutional Encoder-Decoder Architecture for Image Segmentation," in IEEE Transactions on Pattern Analysis and Machine Intelligence, vol. 39, No. 12, pp. 2481-2495, Dec. 1, 2017, doi: 10.1109/TPAMI.2016.2644615.

Fei, Yue, et al. "Pixie-level Cracking Detection on 3D Asphalt Pavement Images Through Deep-Learning Based CrackNet-V," IEEE Transactions on Intelligent Transportation Systems, vol. 21, No. 1, 273-284 (2020).

Zhang, Allen, et al. "Automated Pixel-Level Pavement Crack Detection on 3D Asphalt Surfaces Using a Deep-Learning Network," Computer-Aided Civil and Infrastructure Engineering 32 (2017) 805-819.

Chen, Hanshen, et al., "Improving the Efficiency of Encoder-Decoder Architecture for Pixel-Level Crack Detection," IEEE Access 7 (2019): 186657-186670.

Cha, Young-Jin, Wooram Choi, and Oral Buyukozturk. "Deep learning-based crack damage detection using convolutional neural networks." Computer-Aided Civil and Infrastructure Engineering 32.5 (2017): 361-378. (Year: 2017).

Bang, Seongdeok, et al. "Encoder-decoder network for pixel-level road crack detection in black-box images." Computer-Aided Civil and Infrastructure Engineering 34.8 (2019): 713-727. (Year: 2019).

Fei, Yue, et al. "Pixel-level cracking detection on 3D asphalt pavement images through deep-learning-based CrackNet-V." IEEE Transactions on Intelligent Transportation Systems 21.1 (2019): 273-284. (Year: 2019).

Final Office Action dated Jul. 11, 2024 in U.S. Appl. No. 17/313,070.

* cited by examiner

DEEP LEARNING-BASED CRACK SEGMENTATION THROUGH HETEROGENEOUS IMAGE FUSION

CROSS-REFERENCE TO RELATED APPLICATIONS

This application claims priority to U.S. Provisional Application Ser. No. 63/031,862, filed on May 29, 2020, and entitled "DEEP LEARNING-BASED CRACK SEGMENTATION THROUGH HETEROGENEOUS IMAGE FUSION." The contents of which are hereby incorporated by reference in their entirety.

BACKGROUND

Recent years have witnessed a steady trend of growth in the transportation infrastructure investment. For example, according to the U.S. Census Bureau, the total construction spending on highway and street during March 2020 was estimated at a seasonally adjusted annual rate (SAAR) of 108.6 billion dollars, 4.5% higher than in February 2020 and 5.3% higher than in March 2019. Over a wider time span, the SAAR of the construction spending on highway and street has steadily increased from 78.2 billion dollars in March 2010 to 108.6 billion dollars in March 2020, at an annualized growth rate of 3.3%. Alongside the vigorous development of the transportation infrastructure, there has been a rising demand for a more efficient investment on transportation infrastructure by facilitating performance-based decision-making and appropriately managing infrastructure assets for better stewardship of the transportation system.

Enacted since 2005, the Moving Ahead for Progress in the 21st Century Act (MAP-21) sets the course for transportation investment in highways to address many challenges facing the U.S. transportation system such as improving safety and maintaining infrastructure condition. One of the core concepts and requirements under MAP-21 is to establish performance-based planning and programming to promote an efficient transportation system and improve transportation decision-making. For the Federal Highway Administration (FHWA), State Department of Transportation (DOT), and local governments, long-term efforts need to be devoted to implementing performance management activities and methodologies, such that the requirements by the MAP-21 are fulfilled.

Right-of-way (ROW) imagery has become one of the data sources submitted to both the Transportation Asset Management Plans (TAMP) mandated by MAP-21 and the Highway Performance Monitoring System (HPMS). By using image data taken from a ROW imaging system (e.g., a survey vehicle), image-based methodologies with advanced computer vision techniques for roadway defects detection can offer an efficient performance-based framework to facilitate the condition assessment and decision-making process for transportation infrastructure. Thus, it has been a rising interest for professionals and researchers to develop more efficient and accurate image-based methodologies on roadway defects detection for the purpose of promoting social welfare and stimulating economy through improving the transportation system.

Recent decades have witnessed a dramatic increase in the interest and research efforts towards image-based crack detection. Depending on the means of feature extraction and classification, current image-based methods can be mainly categorized as non-learning-based or learning-based methods. The non-learning-based crack detection methods, to which most of early applications belong, typically employ image processing techniques such as filtering, thresholding and morphological operation. In general, these handcrafted image processing techniques are usually involved with parameter selection processes, which may incur subjectivities and thus limit the application of the non-learning-based methods in real-world scenarios. Learning-based methods can alleviate such subjectivities by offering the capability to learn from data and make self-adaptations. Early learning-based methods utilized for crack detection are k-nearest neighbors, support vector machine, and artificial neural network. However, despite their ability to adapt to image data, these learning-based methods only represent a low level of feature abstraction, and thus may also have difficulties in addressing problems with real-world complexities.

In recent years, deep convolutional neural network (DCNN), as a type of deep learning-based method, has rapidly evolved into the most advanced and popular technique for crack detection. The advantage it has over the early learning-based methods is that DCNN can achieve a high-level feature abstraction to tackle problems with real-world complexities through a deep multi-layer architecture layout. Some DCNN methods are patch-based; that is, images are cropped into patches which have smaller sizes, and each image patch is classified by the DCNN as containing cracks or not. Albeit its success, patch-based application has a drawback that the resolution of the detected cracks is limited. Some researchers adopted region-based DCNNs for object detection to generate bounding boxes which enclose the cracking features. Nevertheless, the issue of limited resolution still exists in some region-based DCNNs.

To achieve pixel-level resolution on crack detection, most recent applications explored crack segmentation through DCNN to predict a categorical label (e.g., "crack" vs. "non-crack") for each image pixel. Many DCNN-based crack segmentation studies utilized intensity image due to its easy availability. Applications using intensity images are generally under the assumption that cracked regions are darker (i.e., a lower intensity value) than non-crack regions. However, in intensity image, image disturbances such as uneven illumination, blemishes, shadows, and oil stains often exist, which may potentially cause performance degradation to DCNN-based methods. More recently, range (i.e., elevation) image was explored by some researchers for crack segmentation, relying on the change in elevation to interpret the presence of cracks. Despite the advantages over intensity image such as being insensitive to uneven illumination, range image also has several issues. For example, surface variations and non-crack patterns (e.g., pavement grooves) often exist in range image, bringing uncertainties to crack detection. Therefore, it is common to adopt image pre-processing techniques to enhance the cracking features before applying DCNN and address the issues of surface variations and non-crack patterns.

SUMMARY

In an embodiment, a method for detecting cracks in road segments is provided. The method includes: receiving raw range data for a first image by a computing device from an imaging system, wherein the first image comprises a plurality of pixels; receiving raw intensity data for the first image by the computing device from an imaging system; fusing the raw range data and raw intensity data to generate fused data for the first image by the computing device; extracting a set of features from the fused data for the first image by the computing device; providing the set of features to a trained neural network by the computing device; and generating a label for each pixel of the plurality of pixels by the trained neural network, wherein a received label for a pixel indicates whether or not the pixel is associated with a crack.

In an embodiment, a method for detecting cracks in road segments is provided. The method includes: receiving raw range data for a first image of a road segment by a computing device from an imaging system, wherein the first image comprises a plurality of pixels; receiving raw intensity data for the first image of the road segment by the computing device from the imaging system; fusing the raw range data and raw intensity data to generated fused data by the computing device; extracting a first set of features from the fused data by the computing device; extracting a second set of features from the fused data by the computing device; combining the first set of features and the second set of features to generate a combined set of features for the first image by a process from the neural network; providing the combined set of features to a trained neural network; and generating a label for each pixel of the plurality of pixels by the trained neural network, wherein a received label indicates whether or not the associated pixel is associated with a crack.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

1 Preliminaries

This section introduces two components associated with the proposed DCNN-based methodology: i) a laser imaging system to acquire intensity and range data from roadway surfaces; and ii) quantitative metrics for image binary segmentation analysis. The network layers and training scheme related with the proposed DCNNs are not described herein.

1.1. A Laser Imaging System to Collect Intensity and Range Images

In some embodiments, a laser image and measurement system is utilized for data acquisition. Other data acquisition systems may be used. The system may include a three dimensional (3D) laser camera which can acquire both intensity and range image data. The laser camera may be mounted on the rear top of a vehicle to collect roadway images. The system may further include a data acquisition (DAQ) device and a high-performance laptop for data processing and analysis. During each scan on a roadway surface, the laser camera can capture transverse profiles of both the intensity and range data with spatial correspondence. Some or all of the laser image and measurement system may be implemented using one or more more general purpose computing devices such as the computing device 1000 illustrated with respect to FIG. 10.

Performance Metrics

The DCNN architectures described herein can produce a crack map of the same size as the input image, with each pixel predicted as belonging to the "crack" or "non-crack" category. Accordingly, performance metrics are needed to measure the similarity between the predicted and ground truth pixel labels for each image. This section describes the technical information on three widely used quantitative measures for image binary segmentation analysis, namely the F1 score, intersection over union, and boundary F1 score. Other performance metrics may be used.

1.1.1. F1 Score

The precision-recall analysis used in some embodiments contains three metrics including precision, recall, and F1 score, as expressed in equations 1A, 1B, and 1C (referred to collectively herein as equation 1). Precision is defined as the ratio of the number of correctly identified true crack pixels to the number of pixels predicted as cracks; recall is defined as the ratio of the number of correctly identified true crack pixels to the number of true crack pixels; and F1 score is the harmonic mean of precision and recall, which provides a comprehensive measure on the segmentation performance. Upon evaluating the segmentation performance on the test dataset by each DCNN, not only the average precision, recall, and F1 score are calculated but also their histograms are illustrated to provide a thorough comparison.

$$\text{Precision} = \frac{TP}{TP+FP} \quad (1A)$$

$$\text{Recall} = \frac{TP}{TP+FN} \quad (1B)$$

$$F1 = \frac{2 \cdot \text{Precision} \cdot \text{Recall}}{\text{Precision}+\text{Recall}} \quad (1C)$$

where TP refers to the number of true crack pixels which are correctly identified as crack pixels; FP refers to the number of true non-crack pixels which are misidentified as crack pixels; and FN refers to the number of true crack pixels which are misidentified as non-crack pixels.

1.1.2. Intersection Over Union

Another commonly used performance measure for image segmentation is called intersection over union (IOU). IOU, as expressed in equation 2, is defined as the ratio between the area of overlap and the area of union. In some embodiments, the IOU statistics is calculated to measure the degree of overlap between the predicted and ground truth crack objects (i.e., regions of pixel labels). Both the average value of IOU and its histogram are presented for performance comparison.

$$IOU = \frac{TP}{TP + FP + FN} \quad (2)$$

where the definitions of TP, FP, and FN are the same as in equation 1.

1.1.3. Boundary F1 Score

Boundary F1 (BF) score, which is the F1 score extended to semantic segmentation, may be used as an additional quantitative metric. The BF score, ranging from 0 to 1, measures the similarity between the boundaries of the predicted and ground truth crack objects. Similarly, the average BF score with its histogram is calculated for comparison.

2 Proposed Methodology

This section introduces the proposed methodology, including: i) heterogeneous image data for crack segmentation; and ii) the proposed DCNN architectures which take the heterogenous image data as input.

2.1. Heterogeneous Image Data

Four different types of image data may be used, which are raw intensity, raw range, filtered range, and fused raw image. The characteristics of each type of image data are introduced in this section. Other types of image data may be used.

2.1.1. Raw Intensity Images

Intensity image is used by many image-based techniques for crack detection. The general assumption upon using the intensity image is that cracked regions have lower intensity values (i.e., darker) than non-crack regions. Thus, under the situation of changing illumination condition or low intensity contrast between crack and non-crack regions, the performance of intensity-based crack detection may deteriorate. Moreover, image disturbances such as shadows, blemishes, and oil stains which also have low intensity values may add difficulty and uncertainty to crack detection on intensity images.

2.1.2. Raw Range Images

With the development of laser imaging technology, range (i.e., elevation) images have been adopted for surface crack detection. Range-based methods generally rely on the elevation reduction in cracked regions to interpret the crack presence. Laser-scanned range images are insensitive to changing illumination condition, and noises such as oil stains and blemishes will not interfere with crack detection on range images. Nevertheless, despite its advantages over intensity images, the range images also have issues such as being sensitive to surface variations and non-crack patterns such as pavement grooves. Moreover, it may be challenging for range-based methods to detect shallow cracks.

2.1.3. Filtered Range Images

Figure 1:
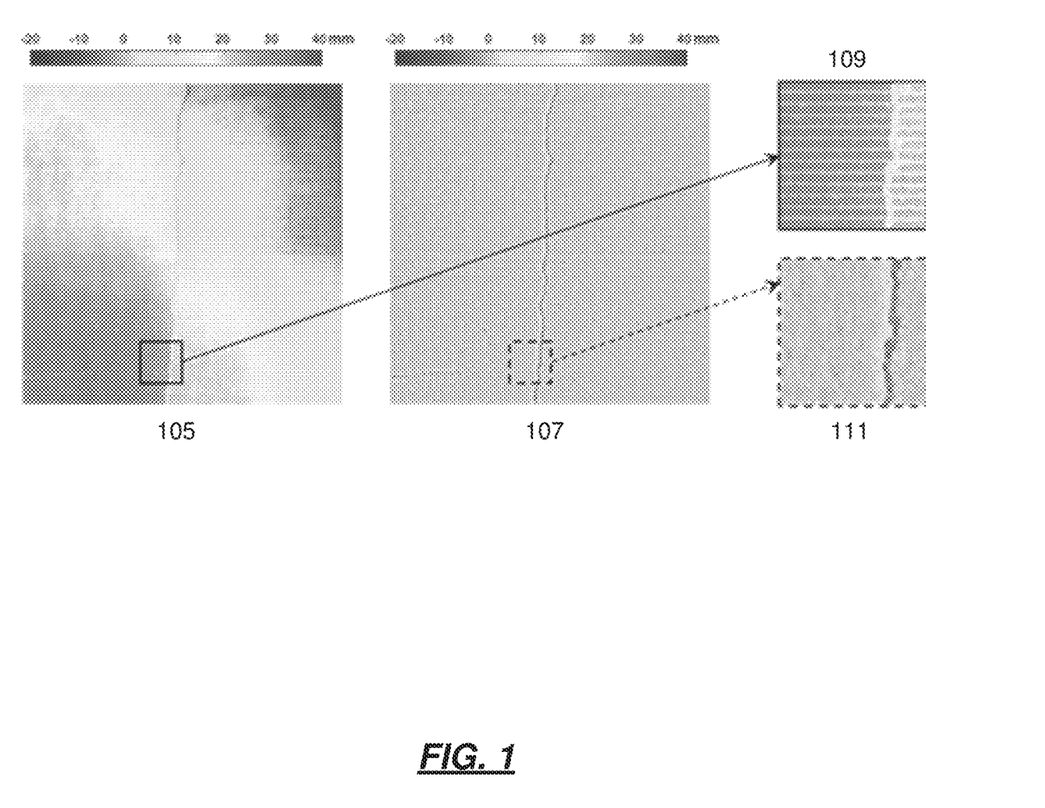
FIG. 1 is an illustration of an example of image pre-processing.

In some embodiments, a filter-based technique may be used to generate filtered range images, addressing the issues of surface variations and grooved patterns in range images. An example of applying this technique for image pre-processing is illustrated in FIG. 1. A raw range image and a filtered range image of a roadway surface are illustrated in FIG. 1 as the images 105 and 107, respectively. The image portion 109 shows a zoomed in portion of the raw range image 105 where a road crack can be observed. The image portion 111 shows a zoomed in portion of the filtered range image 107 where the road crack can be observed.

As can be observed in FIG. 1, the surface variations and grooved patterns are effectively eliminated from the filtered range image surface, while the cracking features are preserved. In some embodiments, through a comparison on the segmentation performance by the same DCNN trained and tested on raw range vs. filtered range images, the effect of image pre-processing can be demonstrated. Meanwhile, it is noted that, although the use of filtered range images may avoid disturbances such as surface variations and grooved patterns, it may also bring uncertainties or subjectivities through parameter selection. Therefore, it may be preferable to directly utilize raw image data for training and testing to improve the robustness of DCNNs against real-world complexities.

2.1.4. Data Fusion to Combine Raw Intensity Images and Range Images

The feasibility of directly combining the information in the raw intensity image and range image to alleviate issues existing in each type of data is contemplated. For example, it may occur that cracks of low contrast in intensity images may be more detectable in the corresponding range images; and, in range images, cracks which have shallow depths may be more apparent in the corresponding intensity data. Thus, the use of fused raw image data (i.e., fused intensity images and range images) can provide complementary and more comprehensive information through cross-domain feature correlation and extraction, which may alleviate the issues in individual source of data.

In some embodiments, a heterogenous data fusion strategy is proposed for DCNN-based roadway crack segmentation. As described above, heterogenous data fusion is a process to obtain more comprehensive information and reduce data uncertainty by integrating multiple sources of data with diverse characteristics instead of examining individual data sources. In some embodiments, the acquired raw intensity and range images with spatial correspondence are directly fused at a data level, by leveraging the concept of hyperspectral imaging. Hyperspectral images have multiple channels with an image component in each channel corresponding to a specific spectral band. In like manner, the raw intensity and range image data can be integrated as hyperspectral imaging.

Figure 2:
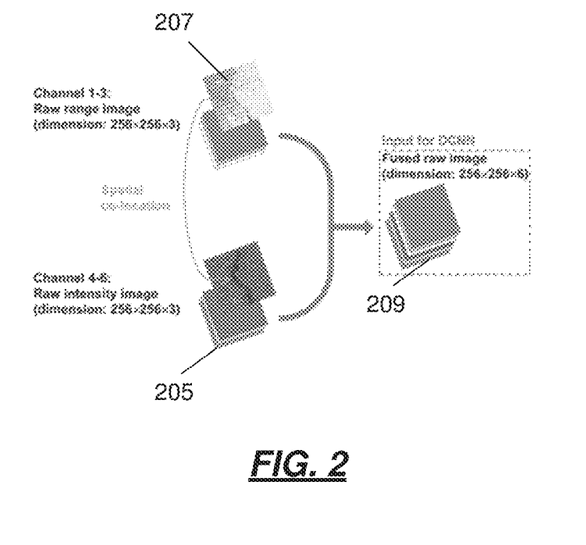
FIG. 2 is an illustration of fused raw image data.

FIG. 2 illustrates an example of fused raw image data 209, where the channels 1-3 of the hyperspectral image are the RGB channels of a raw range image 207 (dimension: 256×256×3), and the channels 4-6 are the RGB channels of a raw intensity image 205 (dimension: 256×256×3). It is noted that the range and intensity image data may be converted into 24-bit RGB image data format during data acquisition. As highlighted in FIG. 2, the "spatial co-location" feature may be generated through data fusion based on the fact that the intensity and range image data have pixel-to-pixel location correspondence, which is enabled by the 3D laser imaging system. The spatial co-location feature may uniquely identify the portion of the road segment that each pixel corresponds to. Thus, such features can be exploited to address issues existing in individual data source and facilitate DCNN-based crack segmentation through cross-domain feature correlation and extraction.

2.2. Proposed DCNN Architectures

Encoder-decoder network is a popular DCNN schema for crack segmentation, which consists of two components: an encoder and a decoder. The encoder usually contains multiple convolutional layers for image down-sampling and feature extraction, and auxiliary layers such as batch normalization and leaky rectified linear unit (LReLU). The decoder utilizes multiple transposed convolutional layers to up-sample the feature map to match the dimension between the input image and output crack map; besides, auxiliary layers such as batch normalization, LReLU, and softmax layers are adopted in the decoder.

In some embodiments, three encoder-decoder networks, denoted as Net-1, Net-2, and Net-3, are proposed to exploit heterogeneous image data. It is noteworthy that these architectures are designed such that they consume similar amounts of parameters indicating their similar model complexity.

2.2.1. Encoder-Decoder Network for a Single Type of Image Data

Figure 3:
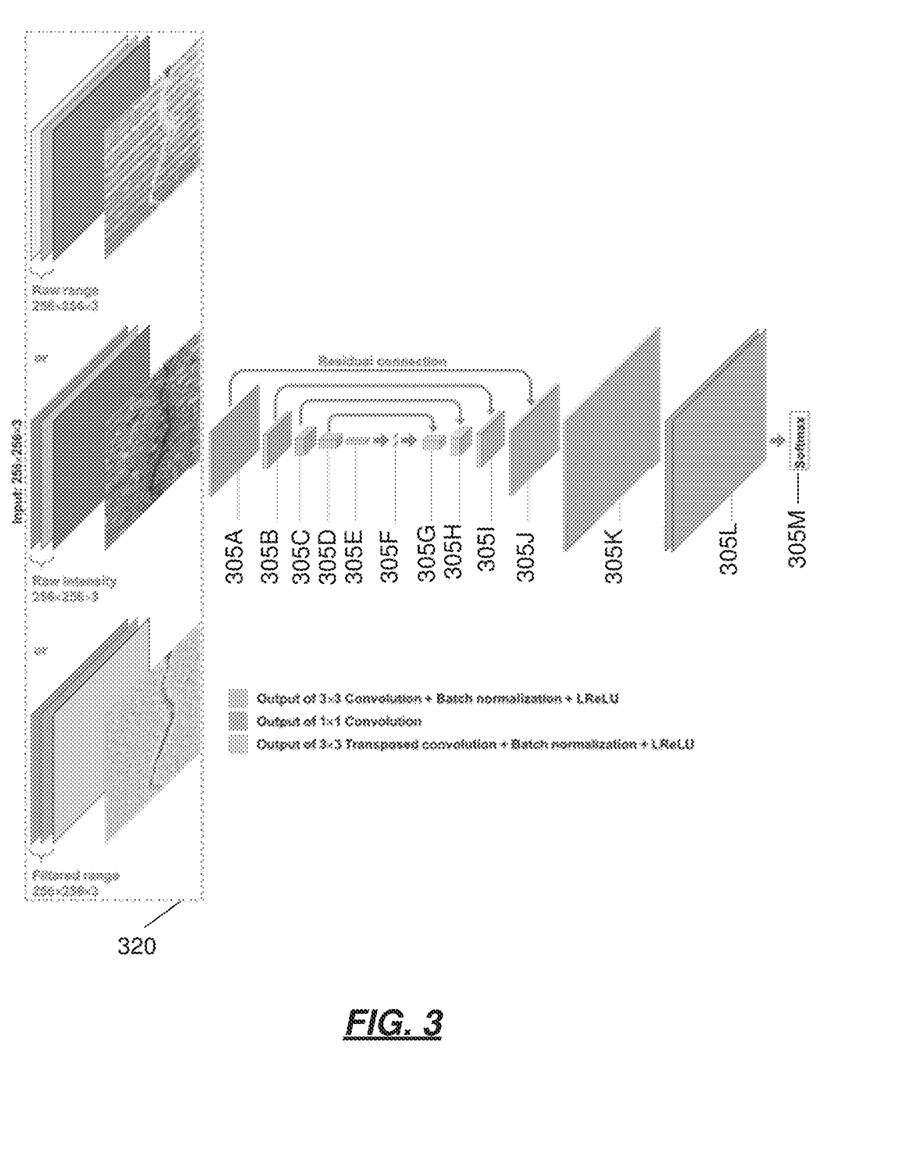
FIG. 3 is an illustration of an encoder-decoder network to take a single type of image data.

FIG. 3 illustrates the layout of Net-1, an encoder-decoder network designed to take a single type of image data 130, such as raw intensity, raw range, or filtered range image. As displayed in FIG. 3, the encoder of Net-1 contains five convolutional blocks 305 (e.g., the blocks 305A, 305B, 305C, 305D, and 305E). Each convolutional block 305 may include a convolutional layer using multiple 3×3 kernels with a stride of 2 for feature extraction, a batch normalization layer to improve generalization, and a LReLU layer to provide nonlinearity.

After feature extraction through the encoder, a convolutional layer 305F with 1×1 kernels is utilized for cross-channel pooling. Subsequently, in the decoder, five transposed convolutional blocks are adopted (e.g., the blocks 305G, 305H, 305I, 305J, and 305K). Each transposed convolutional block may include a transposed convolutional layer for feature up-sampling, and auxiliary layers including batch normalization and LReLU. At the end of the decoder, a convolutional layer 305L is utilized for cross-channel pooling on the expanded feature maps, and the output is normalized by a softmax layer 305M to generate a crack probability map.

It is noted that the convolutional and transposed convolutional blocks are connected through residual connections, as illustrated in FIG. 3. Adding residual connections in a deep architecture may help prevent performance degradation and avoid data singularity. In some embodiments, low-level features extracted by the convolutional blocks in the encoder are merged with the high-level feature output of the transposed convolutional blocks in the decoder through an arithmetic addition operation.

2.2.2. Encoder-Decoder Networks for Fused Raw Image Data

Two encoder-decoder networks, Net-2 and 3, are developed for fused raw image data. The major difference is that Net-2 directly exploits the fused raw image data containing spatial co-location features through a convolutional operation, which can be referred to as a "fuse-extract" pattern. Net-3, which has a two-stream encoder layout, performs feature extraction on separate image data, and then fuse the high-level features through an addition operation, which can be considered as an "extract-fuse" pattern. Net-2 and Net-3 have the same decoder layout, hence the influencing factor on their segmentation performance stems from different strategies to exploit the fused raw image data and the associated encoder layouts.

i) Net-2: An Encoder-Decoder Network with a "Fuse-Extract" Pattern

Figure 4:
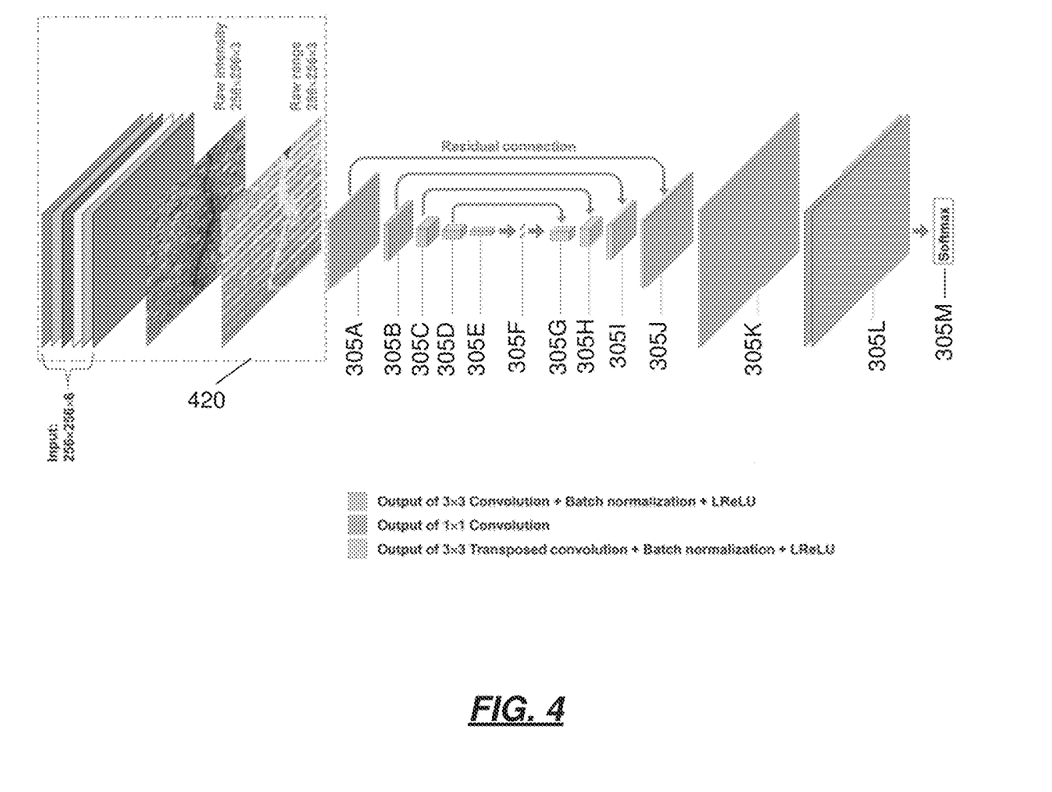
FIG. 4 is an illustration of an encoder-decoder network to take fused raw image data.

Net-2 represents a straightforward and intuitive approach by modifying the input layer of a DCNN to exploit the fused raw image data. As illustrated in FIG. 4, the layout of Net-2 is the same as that of Net-1 (e.g., the blocks or layers 305A-305M) except the image input layer 420, where the input for Net-2 contains 6 channels comprised of raw range and intensity data. Due to the change of input dimension, the kernel sizes in the first convolutional layer 305A may be changed accordingly.

ii) Net-3: An Encoder-Decoder Network with an "Extract-Fuse" Pattern

Figure 5:
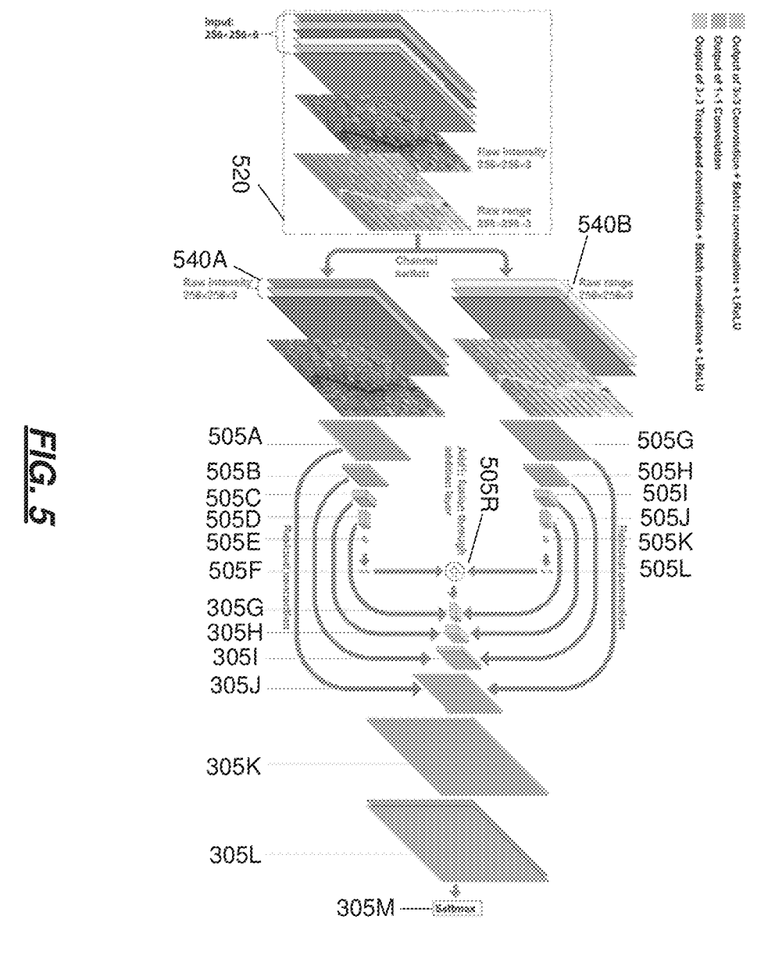
FIG. 5 is an illustration of a two-stream encoder-decoder network to take fused raw image data.

As illustrated in FIG. 5, the input data 520 is separated and provided to the encoder of Net-3 as two streams 540, one for the raw range image component (i.e., the stream 540A), and the other for the raw intensity image component (i.e., the stream 540B). In the encoder, feature extraction is performed separately on the raw range or intensity image data. As shown, the encoder comprises the blocks 505A-505E that process the raw intensity data and the blocks 505G-505L that process the raw range data.

The extracted features in each stream are then fused through an addition layer 505R ("Add1" in FIG. 5) which performs an arithmetic addition operation. Such a fusion strategy can be considered as an "extract-fuse" pattern, different than the "fuse-extract" pattern adopted in Net-2. Regarding the decoder, Net-3 utilizes the same decoder module as Net-1 and 2 for feature map expansion (e.g., the blocks 305G-305K). Meanwhile, residual connections are employed to merge the low-level features from both streams in the encoder with the high-level features in the decoder. It is noted that, the total number of parameters of Net-3 (23491334) is similar to that of Net-2 (22013572), implying very similar model complexity. Then, the difference in segmentation performance on the fused raw image data is solely induced by the different encoder modules.

Figure 6:
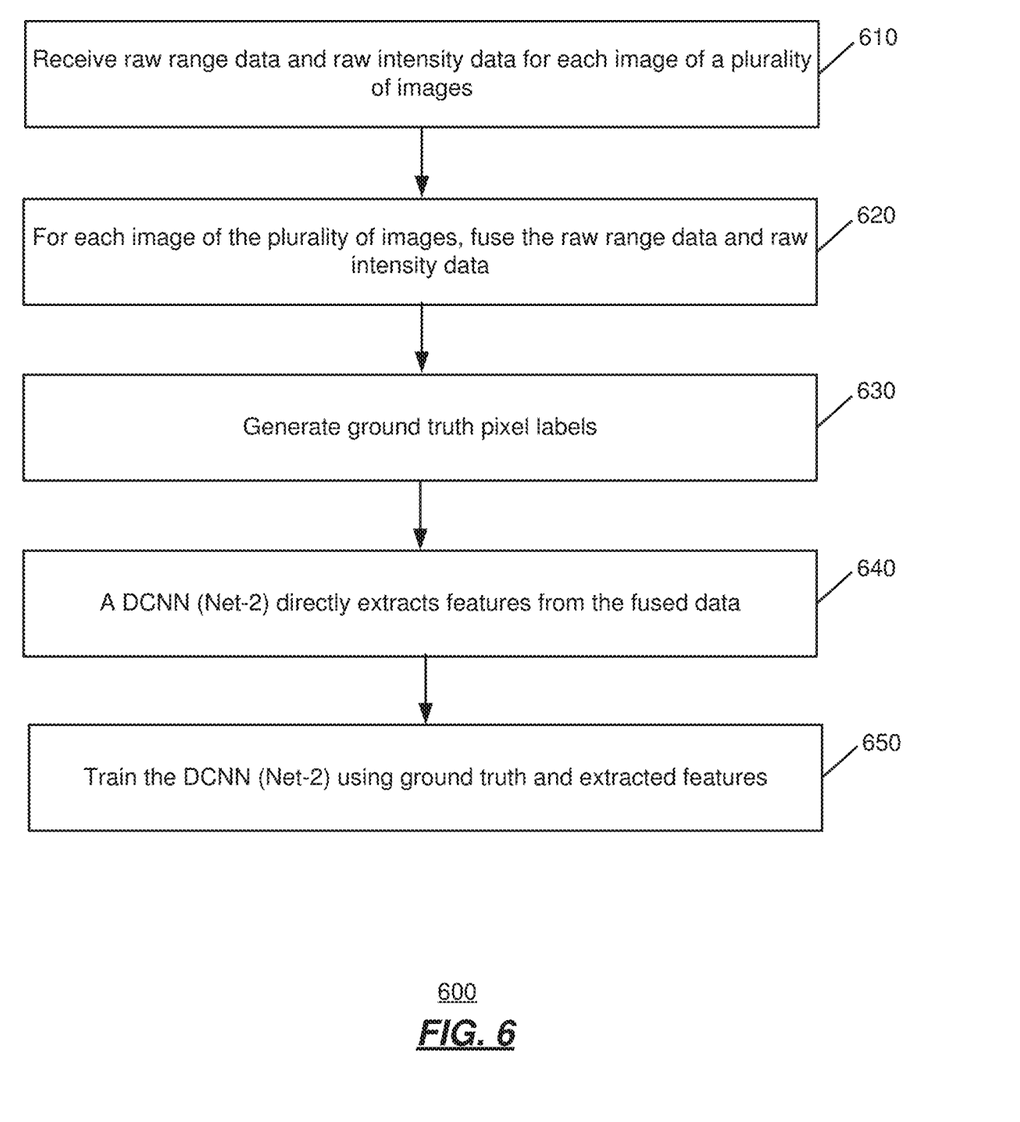
FIG. 6 and FIG. 7 are illustrations of example methods for detecting cracks using the Net-2 technique.

FIG. 6 is an operational flow of an implementation of a method 600 for training a DCNN to detect cracks in images. The method 600 may be implemented by the imaging system and the computing system 1000 illustrated with respect to FIG. 10. The method 600 may be based on the Net-2 encoder/decoder described above.

At 610, raw range data and raw intensity data is received. The data may be received by a computing system from the imaging system. The raw range data and raw image data may correspond to a plurality of images of road segments. Each image may be associated with a ground truth label that indicates whether the image depicts a crack. Depending on the embodiment, the images may have been labeled by human reviewers. The raw range data may be 3D. The raw intensity data may be 2D.

At 620, for each image of the plurality of images, the raw range data and the raw intensity data are fused using heterogenous data fusion. The data may be fused to generate fused data by the computing system. Any method for fusing range data and intensity data may be used.

At 630, ground truth pixel labels are generated for each image of the plurality of images. The labels may be generated by a human reviewer.

At 640, features are extracted from the combined data. The features may be extracted by the DCNN (Net-2) directly from the fused data.

At 650, the DCNN (Net-2) is trained using the extracted features and the ground truth pixel labels. The DCNN may be trained by the computing system. Any method for model training may be used.

Figure 7:
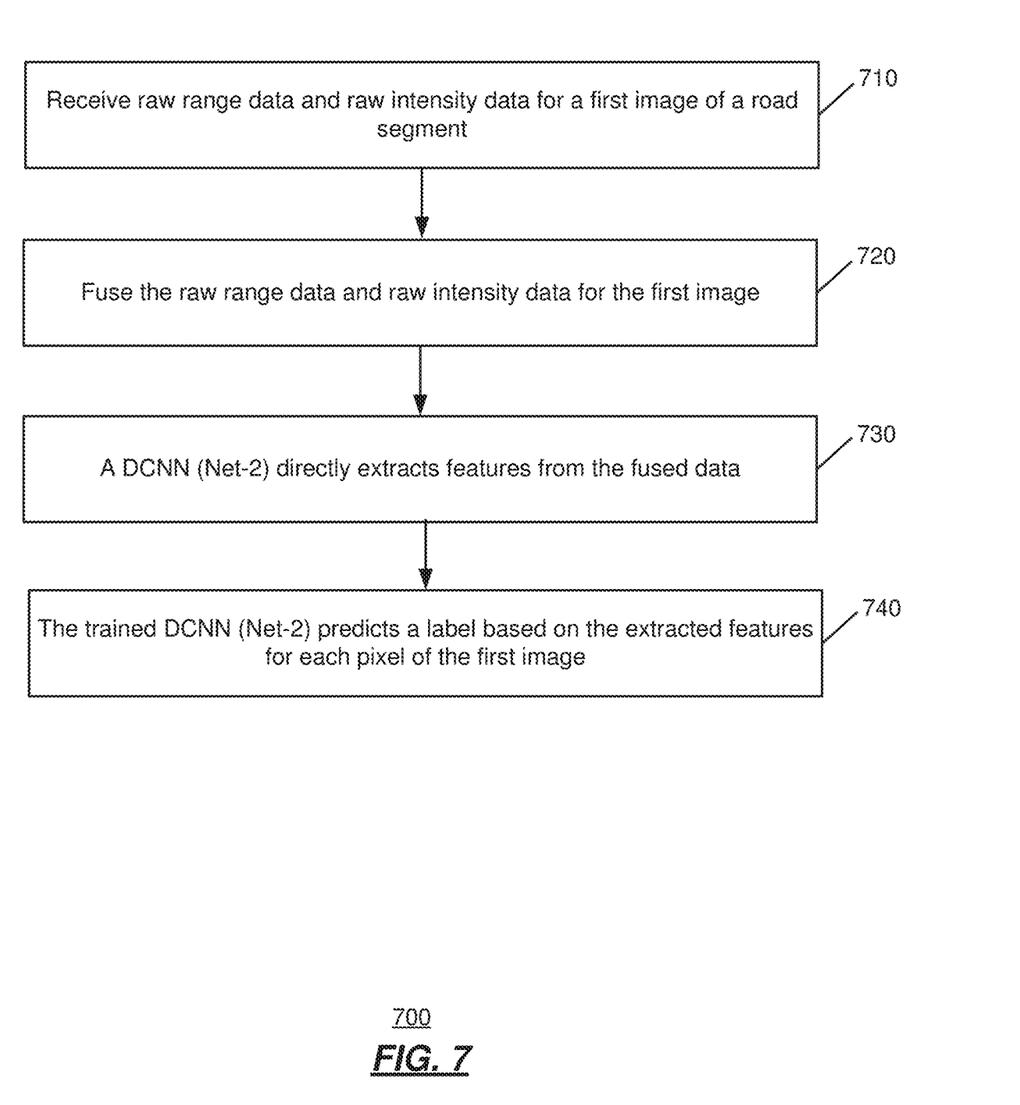

FIG. 7 is an operational flow of an implementation of a method 700 for using a DCNN to detect cracks in images. The method 700 may be implemented by the imaging system and the computing system 1000 illustrated with respect to FIG. 10. The method 700 may be based on the Net-2 technique described above.

At 710, raw range data and raw intensity data are received for a first image of a road segment. The raw range and intensity data may be received by the computing system from the imaging system. Depending on the embodiment, the raw data may be received from a camera of a vehicle driving on the road segment.

At 720, the raw range data and the raw intensity data is fused. The data may be fused by the computing system.

At 730, a set of features is extracted from the fused data. The set of features may be extracted directly by the DCNN (Net-2).

At 740, the trained DCNN (Net-2) predicts a label for each pixel based on the extracted set of features for the first image. The label may indicate whether or not the first image includes a crack.

Figure 8:
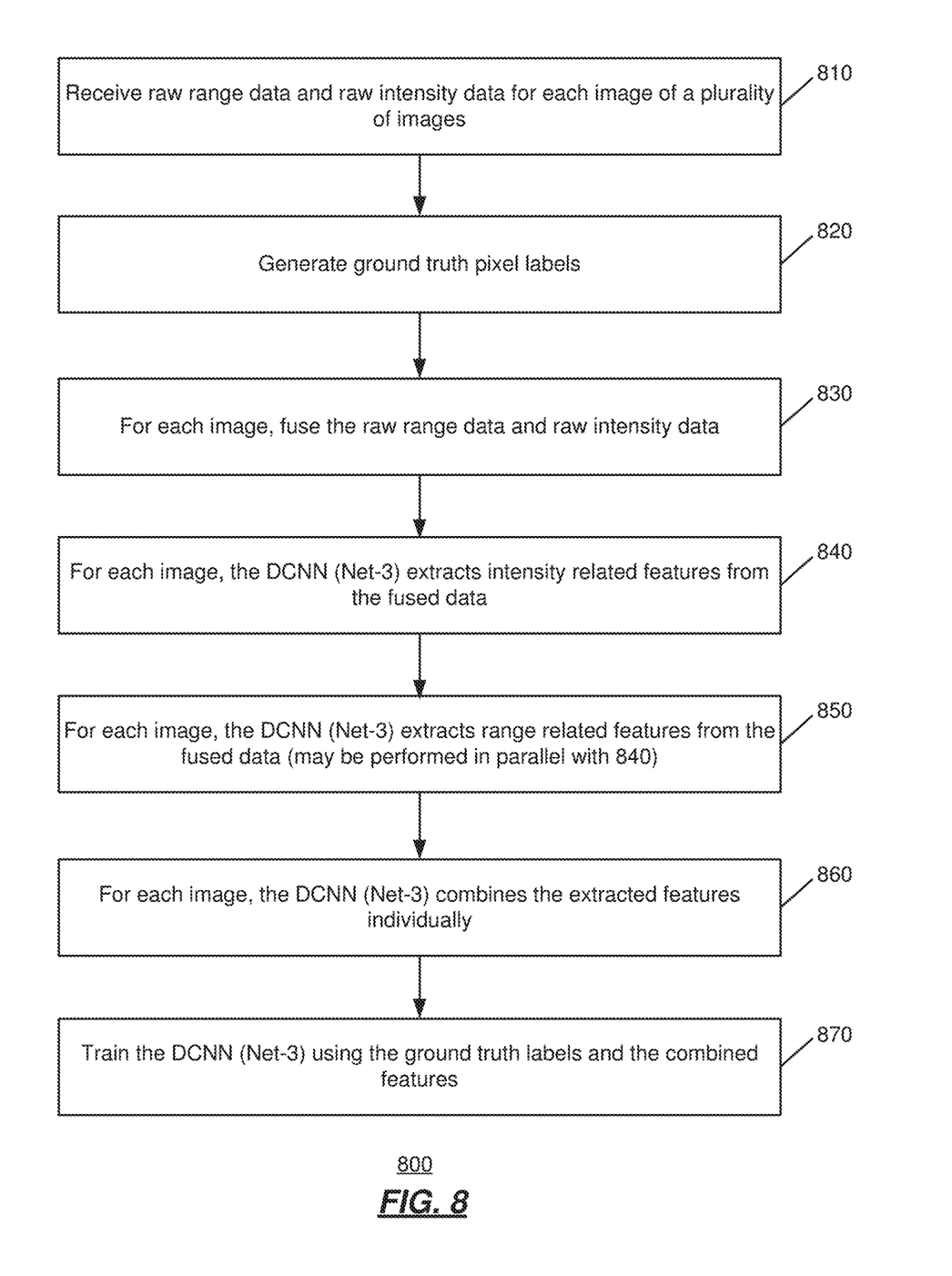
FIG. 8 and FIG. 9 are illustrations of example methods for detecting cracks using the Net-3 technique.

FIG. 8 is an operational flow of an implementation of a method 800 for training a DCNN to detect cracks in images. The method 800 may be implemented by the imaging system and the computing system 1000 illustrated with respect to FIG. 10. The method 800 may be based on the Net-3 technique described above.

At 810, raw range data and raw intensity data are received. The data may be received by the computing system from the imaging system. The raw range data and raw intensity data may correspond to a plurality of images.

At 820, ground truth pixel labels are generated for each image. The labels may be generated by human reviewers.

At 830, for each image of the plurality of images, the raw range data and the raw intensity data are fused using heterogenous data fusion. The data may be fused to generate fused data by the computing system.

At 840, for each image, intensity related features are extracted from the fused data. The features may be extracted by the DCNN (Net-3).

At 850, for each image, range related features are extracted from the fused data. The features may be extracted by the DCNN (Net-3).

At 860, for each image of the plurality of images, the features extracted individually are combined. The features may be combined to generate combined features by the DCNN (Net-3). The extracted features may be combined using an addition layer that performs an arithmetic addition operation.

At 870, the DCNN (Net-3) is trained using the combined features and labels. The DCNN may be trained by the computing system. Any method for model training may be used.

Figure 9:
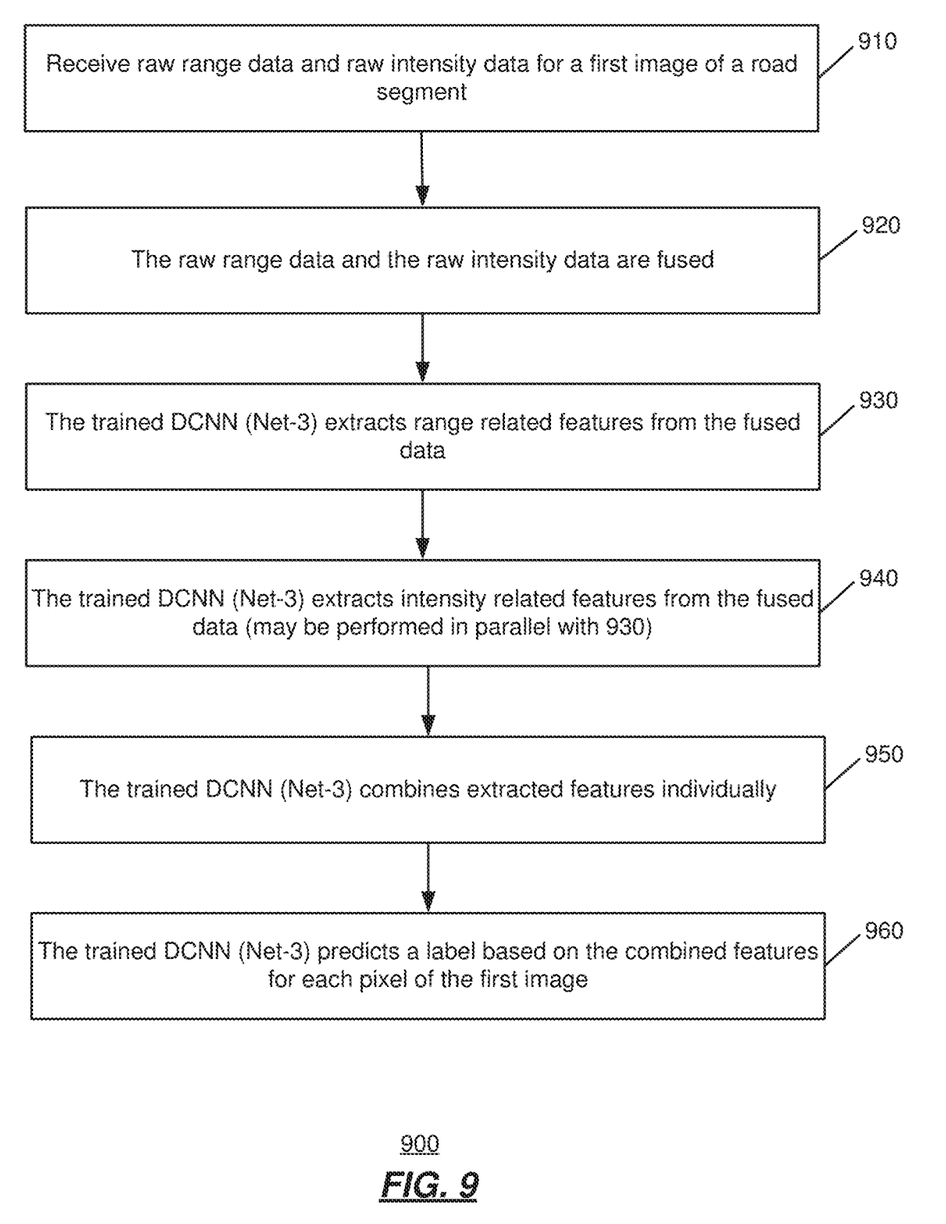

FIG. 9 is an operational flow of an implementation of a method 900 for using a DCNN to detect crack in images. The method 900 may be implemented by the imaging system and the computing system 1000 illustrated with respect to FIG. 10. The method 900 may be based on the Net-3 technique described above.

At 910, raw range data and raw intensity data is received for a first image of a road segment. The raw range and image data may be received by the computing system from the imaging system. Depending on the embodiment, the raw data may be received from a camera of a vehicle driving on a road segment.

At 920, the raw range data and the raw intensity data for the first image are fused using heterogenous data fusion. The data may be fused to generate fused data by the computing system.

At 930, a set of range related features is extracted from the fused data. The set of features may be extracted by the trained DCNN (Net-3).

At 940, a set of intensity related features is extracted from the fused data. The set of features may be extracted by the trained DCNN (Net-3).

At 950, the extracted features are combined. The features may be combined by the trained DCNN (Net-3). The extracted features may be combined using an addition layer that performs an arithmetic addition operation.

At 960, a label is predicted for each pixel of the first image. The label may be predicted by the trained DCNN (Net-3) using the combined features. The label may indicate whether or not the first image of the road segment includes a crack.

Figure 10:
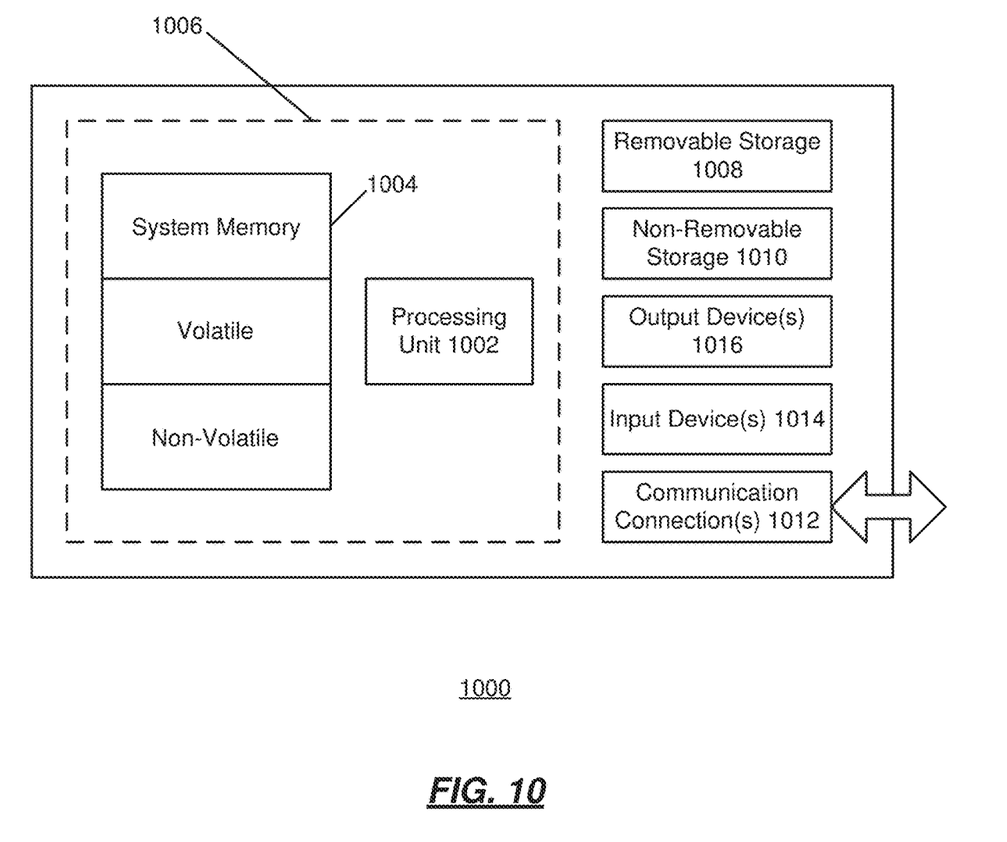
FIG. 10 shows an exemplary computing environment in which example embodiments and aspects may be implemented.

FIG. 10 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for detecting cracks in road segments comprising:
    receiving raw 3D range data for a first image by a computing device from an imaging system, wherein the first image comprises a plurality of pixels;
    receiving raw 2D intensity data for the first image by the computing device from an imaging system, wherein the raw 2D intensity data have pixel-to-pixel location correspondence with the raw 3D range data, wherein the pixel-to-pixel location correspondence between the raw 2D intensity range data and raw 3D range data generates spatial co-location features that each uniquely identify a portion of a road segment that each pixel of the plurality of pixels correspond to;
    generating fused data containing the spatial co-location features by integrating the raw 3D range data and raw 2D intensity data to generate fused data for the first image by the computing device, wherein the fused data is generated directly from the raw 3D range data and the raw 2D intensity data without any preprocessing or filtering of the raw 3D range data or the raw 2D intensity data;
    providing the co-location features to a deep convolutional neural network ("DCNN") by the computing device; and
    receiving a label for each pixel of the plurality of pixels from the DCNN by the computing device, wherein a received label for a pixel indicates whether or not the pixel is associated with a crack, wherein the raw 2D intensity data and the raw 3D range data each comprise a same number of pixels, wherein the DCNN is an encoder-decoder network that receives the raw 2D intensity data and raw 3D range data with the pixel-to-pixel location correspondence, wherein the encoder-decoder network comprises an encoder module and a decoder module, wherein the encoder module comprises two branches, wherein each branch of the encoder module contains a plurality of convolutional layers, wherein the decoder module contains a same number of transposed convolutional layers as either branch of the encoder module, wherein the first branch of the encoder module receives the raw 2D intensity data and produces intensity-based features, wherein the second branch of the encoder module receives the raw 3D range data and produces range-based features, and further wherein the output features from both branches are integrated through an addition operation.

2. The method of claim 1, further comprising training the neural network by:
    receiving raw 3D range data for each image of a plurality of images;
    receiving raw 2D intensity data for each image of the plurality of images, wherein the raw 2D intensity data for an image have pixel-to-pixel location correspondence with the raw 3D range data, and wherein the pixel-to-pixel location correspondence between the raw 2D intensity range data and raw 3D range data generates spatial co-location features that each uniquely identify a portion of a road segment that each pixel of the plurality of pixels correspond to;
    generating a ground truth label for each image of the plurality of images, wherein cracking features from both the raw 2D intensity data and raw 3D range data and the spatial co-location features are collectively considered when generating the ground truth label;
    for each image of the plurality of images, fusing the raw 2D intensity data and the raw 3D range data to generate fused data including the co-location features for the image;
    training the DCNN using the fused data with spatial co-location features and the ground-truth labels for each image of the plurality of images.

3. The method of claim 1, wherein each convolutional layer in the first branch of the encoder module is connected to a transposed convolutional layer in the decoder module through a residual connection to fuse the intensity-based features, and each convolutional layer in the second branch of the encoder module is connected to the same transposed convolutional layer in the decoder module through another residual connection to fuse the range-based features.

4. The method of claim 1, wherein each convolutional layer in the first branch of the encoder module is connected to a transposed convolutional layer in the decoder module through a residual connection to fuse the intensity-based features, and each convolutional layer in the second branch of the encoder module is connected to the same transposed convolutional layer in the decoder module through another residual connection to fuse the range-based features.

5. The method of claim 4, wherein the encoder module comprises two branches that contain a plurality of 2D convolutional layers, and wherein each convolutional layer decreases the height and width dimensions of the input features by a factor of ½, and wherein the output features of each convolutional layer are processed through a Batch Normalization layer followed by a Leaky Rectified Linear Unit.

6. The method of claim 4, wherein the decoder module comprises a plurality of 2D transposed convolutional and wherein each transposed convolutional layer increases the height and width dimensions of the input features by a factor of 2, and wherein the output features of each transposed convolutional layer are processed through a Batch Normalization layer followed by a Leaky Rectified Linear Unit.

7. A system for detecting cracks in road segments comprising:
an imaging device; and
a computing device configured to:
receive raw 3D range data for a first image of a road segment from an imaging device, wherein the first image comprises a plurality of pixels;
receive raw 2D intensity data for the first image of the road segment from the imaging device, wherein the raw 2D intensity data have pixel-to-pixel location correspondence with the raw 3D range data, and wherein the pixel-to-pixel location correspondence between the raw 2D intensity range data and raw 3D range data generates spatial co-location features that each uniquely identify a portion of a road segment that each pixel of the plurality of pixels correspond to;
generate fused data containing the spatial co-location features by integrating the raw 3D range data and raw 2D intensity data to generate fused data, wherein the fused data is generated directly from the raw 3D range data and the raw 2D intensity data without any preprocessing or filtering of the raw 3D range data or the raw 2D intensity data;
provide the co-location features to a deep convolutional neural network "DCNN"); and
receive a label for each pixel of the plurality of pixels from the DCNN, wherein a received label indicates whether or not the associated pixel is associated with a crack, wherein the raw 2D intensity data and the raw 3D range data each comprise a same number of pixels, wherein the DCNN is an encoder-decoder network that receives the raw 2D intensity data and raw 3D range data with the pixel-to-pixel location correspondence, wherein the encoder-decoder network comprises an encoder module and a decoder module, wherein the encoder module comprises two branches, wherein each branch of the encoder module contains a plurality of convolutional layers, wherein the decoder module contains a same number of transposed convolutional layers as either branch of the encoder module, wherein the first branch of the encoder module receives the raw 2D intensity data and produces intensity-based features, wherein the second branch of the encoder module receives the raw 3D range data and produces range-based features, and further wherein the output features from both branches are integrated through an addition operation.

8. The system of claim 7, further comprises training the neural network by:
receiving raw 3D range data for each image of a plurality of images;
receiving raw 2D intensity data for each image of the plurality of images, wherein the raw 2D intensity data for an image have pixel-to-pixel location correspondence with the raw 3D range data, and wherein the pixel-to-pixel location correspondence between the raw 2D intensity range data and raw 3D range data generates spatial co-location features that each uniquely identify a portion of a road segment that each pixel of the plurality of pixels correspond to;
for each image of the plurality of images, fusing the raw 3D range data and the raw 2D intensity data to generate the fused data with spatial co-location features for the image; and
training the DCNN using the fused data with the spatial co-location features and ground truth pixel-level crack labels for each image of the plurality of images.

9. The system of claim 7, wherein each convolutional layer in the first branch of the encoder module is connected to a transposed convolutional layer in the decoder module through a residual connection to fuse the intensity-based features, and each convolutional layer in the second branch of the encoder module is connected to the same transposed convolutional layer in the decoder module through another residual connection to fuse the range-based features.

10. The system of claim 9, wherein a number of convolutional kernels of each convolutional layer in either branch of the encoder module equals two times the number of convolutional kernels of a preceding convolutional layer, and wherein a number of transposed convolutional kernels of each transposed convolutional layer in the decoder module equals two times the number of transposed convolutional kernels of a later transposed convolutional layer.

11. The system of claim 10, wherein the encoder module comprises two branches that contain a plurality of 2D convolutional layers, and wherein each convolutional layer decreases the height and width dimensions of the input features by a factor of ½, and wherein the output features of each convolutional layer are processed through a Batch Normalization layer followed by a Leaky Rectified Linear Unit.

12. The system of claim 7, wherein the decoder module comprises a plurality of transposed convolutional and wherein each transposed convolutional layer increases the height and width dimensions of the input features by a factor of 2, and wherein the output features of each transposed convolutional layer are processed through a Batch Normalization layer followed by a Leaky Rectified Linear Unit.

* * * * *